US007737997B2

(12) United States Patent
Sathe et al.

(10) Patent No.: US 7,737,997 B2
(45) Date of Patent: Jun. 15, 2010

(54) COLLISION DETECTION OF CONCAVE BODIES USING ART GALLERY PROBLEM AND CUBE MAPS

(75) Inventors: Rahul P. Sathe, Hillsboro, OR (US); Adam T. Lake, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 362 days.

(21) Appl. No.: 11/647,657

(22) Filed: Dec. 28, 2006

(65) Prior Publication Data

US 2008/0158225 A1 Jul. 3, 2008

(51) Int. Cl.
*G09G 5/00* (2006.01)
*G06T 15/00* (2006.01)
(52) U.S. Cl. .................. 345/619; 345/419
(58) Field of Classification Search ............. None
See application file for complete search history.

(56) References Cited

U.S. PATENT DOCUMENTS 6,798,415 B2    9/2004  Lake et al.
7,146,297 B2 *  12/2006 Marshall et al. ............ 703/6
2002/0060685 A1 *  5/2002 Handley et al. ........... 345/582
2004/0207624 A1 * 10/2004 Saito et al. ............... 345/426
2006/0235659 A1 * 10/2006 Stam ........................ 703/2

OTHER PUBLICATIONS

Philip M. Hubbard, Approximating polyhedra with spheres for time-critical collision detection, ACM Transactions on Graphics (TOG), v.15 n.3, p. 179-210, Jul. 1996.*
Jiménez, J.J., Segura, R.J., Feito, F.R.: Efficient Collision Detection between 2D Polygons. Journal of WSCG, vol. 12, No. 1-3, ISSN 1213-6972 WSCG'2004, Feb. 2-6, 2003, Plzen, Czech Republic.*

* cited by examiner

*Primary Examiner*—Daniel F Hajnik
(74) *Attorney, Agent, or Firm*—Blakely, Sokoloff, Taylor & Zafman LLP

(57) ABSTRACT

A method is disclosed. The method includes receiving a first polygon, receiving a second polygon, determining a first distance corresponding to a distance from a first origin of the first polygon to a vertex of the second polygon, the origin of the first polygon and the vertex of the second polygon defining a direction vector, determining, along the direction vector a second distance corresponding to a distance from the first origin of the first polygon to a face of the first polygon; and detecting a collision between the first and second polygons if the second distance is greater than or equal to the first distance.

15 Claims, 8 Drawing Sheets

COLLISION DETECTION OF CONCAVE BODIES USING ART GALLERY PROBLEM AND CUBE MAPS

FIELD OF THE INVENTION

The present invention relates to computer systems; more particularly, the present invention relates to graphics hardware.

BACKGROUND

Collision detection in three-dimensional (3D) graphics is the process of determining whether two objects, typically rigid bodies comprising linked polygons such as triangles, are in contact with each other. Usually this is done by having a processor implement an algorithm to calculate whether a triangle of one object conflicts spatially with a triangle of another object. Although there are a variety of approaches to this problem all standard solutions use the processor to execute calculations including testing for object-to-object collisions using a spatial data structure such as an octree and then undertaking a series of geometric calculations to assess polygon-to-polygon collisions for those objects whose bounding volumes are shown to be intersection candidates.

When implemented in a processor such as a central processing unit (CPU) these traditional approaches to collision detection can occupy significant computing resources that, particularly in a 3D gaming context, may be better spent in undertaking CPU-specific tasks such as physics calculations or implementing artificial intelligence routines. Moreover, by implementing collision detection in the CPU rather than a dedicated graphics processor such as a graphical processing unit (GPU) the traditional approaches fail to take advantage of the hardware primitives supported by modern graphics texture sampling hardware.

BRIEF DESCRIPTION OF THE DRAWINGS

The accompanying drawings, incorporated in and constituting a part of this specification, illustrate one or more implementations consistent with the principles of the invention and, together with the description of the invention, explain such implementations. The drawings are not necessarily to scale, the emphasis instead being placed upon illustrating the principles of the invention. In the drawings.

DETAILED DESCRIPTION

A collision detection mechanism is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
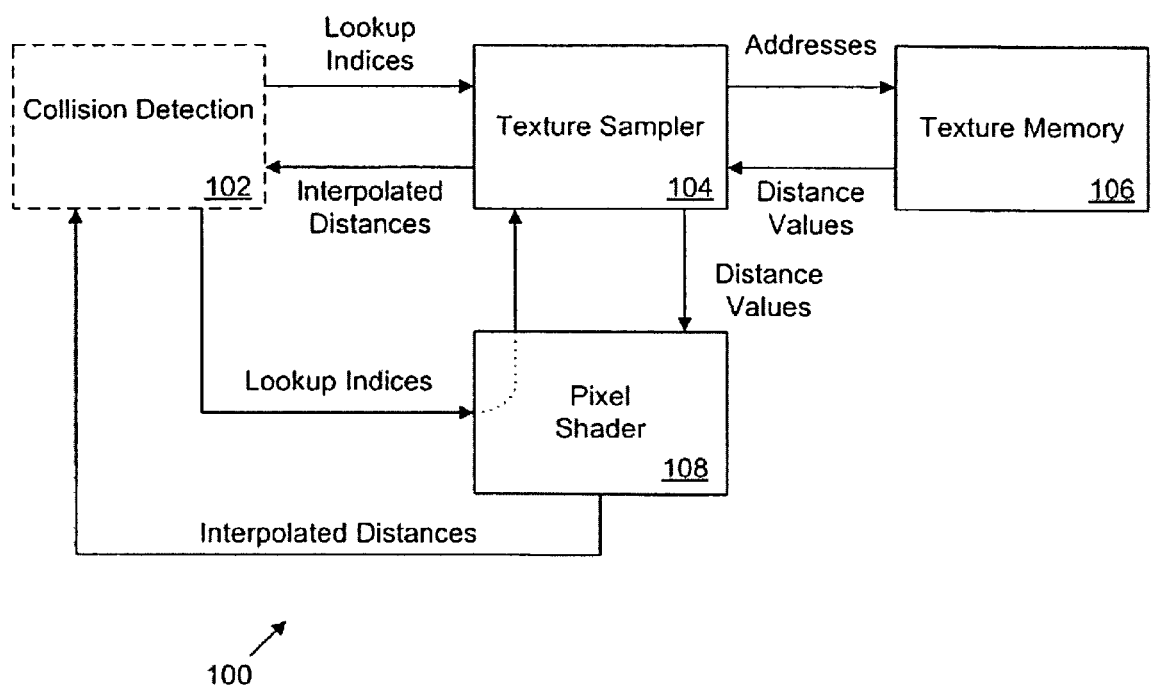
FIG. 1 illustrates one embodiment of a 3D rendering engine.

FIG. 1 is a block illustrating one embodiment of a 3D rendering engine 100. Engine 100 includes a collision detection mechanism 102, a texture sampler 104, and texture memory 106. In other embodiments, 3D rendering engine may include other components (e.g., tessellation unit, vertex shader, etc.). However, such components have been excluded from FIG. 1 so as not to obscure implementations of the invention.

Engine 100 also includes a pixel shader 108 that may be used to couple mechanism 102 to texture sampler 104. Moreover, while FIG. 1 illustrates one texture sampler 104 those skilled in the art will recognize that more than one texture sampler may be implemented and/or coupled to collision detection mechanism 102 and/or memory 106 without departing from the scope and spirit of the claimed invention.

In one embodiment, collision detection mechanism 102 includes a detection routine including any combination of software, and/or firmware that may be used to detect collisions between objects. Thus, mechanism 102 may provide texture sampler 104 with one or more lookup indices. Alternatively, mechanism 102 may provide shader 108 with one or more lookup indices and shader 108 may convey those indices to texture sampler 104.

Sampler 104 may then use those indices to access distance data stored at corresponding texture addresses of a texture map held or stored in texture memory 106 as will be explained in greater detail below. Those skilled in the art will recognize that mechanism 102 may include a collision detection kernel spawned by a 3D graphics application (not shown) executing on a computing system that supports engine 100. Alternatively, mechanism 102 may include a collision detection kernel spawned by pixel shader 108. Those skilled in the art will further recognize that the terms objects, geometries, polyhedrons, bodies and polyhedrons may be used interchangeably.

Texture sampler 104 may be any texture sampling logic including any combination of hardware, software, and/or firmware that is capable of accessing texture data in memory 106 in response to one or more lookup indices provided by mechanism 102. In one embodiment, the texture data stored in memory 106 and accessed by sampler 104 may include a texture map, such as a cube map, comprising an array of pixels (or "texels") storing distance values as will be explained in greater detail below.

Sampler 104 may then use the indices provided by mechanism 102 to determine associated texture addresses to be used to access the corresponding distance values stored and/or held in memory 106. Sampler 104 may then use those distance values to generate interpolated distance values and may provide those interpolated distance values to mechanism 102 as will be described in greater detail below. Alternatively, sampler 104 may provide those distance values to shader 108 and shader 108 may generate interpolated distance values and provide those interpolated distance values to mechanism 102.

Texture memory 106 may include any memory device or mechanism suitable for storing and/or holding one or more texture maps, such as one or more cube maps, specifying texel data such as distance values. While memory 106 may include any volatile or non-volatile memory technology such as Random Access Memory (RAM) memory or Flash memory, the invention is in no way limited by the type of memory employed for use as memory 106.

Figure 2:
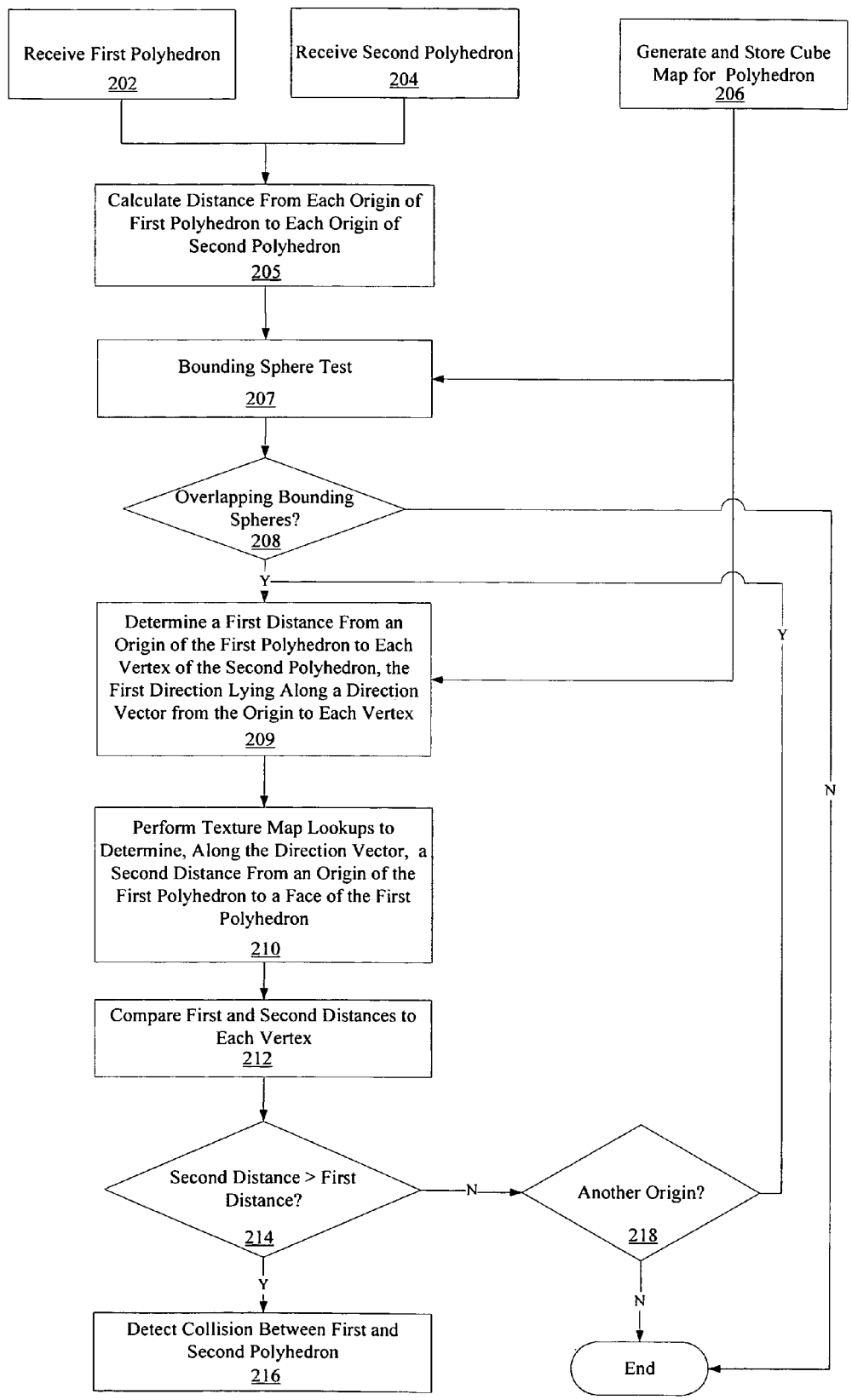
FIG. 2 is a flow chart illustrating one embodiment of collision detection.

FIG. 2 is a flow chart illustrating one embodiment of implementing collision detection at engine 100. At processing blocks 202 and 204, first and second polyhedrons are received, respectively, at collision detection mechanism 102. In one embodiment, the polyhedrons are concave polyhedrons. A concave polyhedron may defined as an object wherein a whole straight line segment joining two points of the object may be found in which the line segment is not completely contained. However, in other embodiments the polygons may be convex polygons. A convex polyhedron may be defined as an object wherein any whole straight line segment joining any two points of the object is contained wholly within the object.

In a further embodiment, processing blocks 202 and 204 may, for example, involve collision detection mechanism 102 receiving vertex coordinates of first and second triangles where those coordinates are defined, for example, with respect to a model coordinate system that may be implemented by a 3D graphics application (now shown). Such a 3D graphics application may spawn mechanism 102 and may supply mechanism 102 with geometric primitives, such as triangles.

In further embodiments, mechanism 102 may have, prior to processing blocks 202 and 204, already subjected 3D graphical objects to a trivial reject phase using a spatial data structure such as an octree or a kd-tree. In doing so, mechanism 102 may have determined that two objects, one including the first polyhedron of processing block 202 and another including the second polyhedron of processing block 204, have passed this reject phase and thus are candidates for further collision detection testing. Details about the various methods of undertaking the trivial reject phase of a collision detection process are beyond the scope of the claimed invention and are well known in the art.

At processing block 206, a cube map is generated for the first and second polyhedrons, and distance values are stored for each. In one embodiment, processing block 206 is implemented in application software in a preprocessing phase occurring prior to any other steps in the process. In other embodiments, processing block 206 may be undertaken by application software in run time concurrent with other components of the process.

Figure 3:
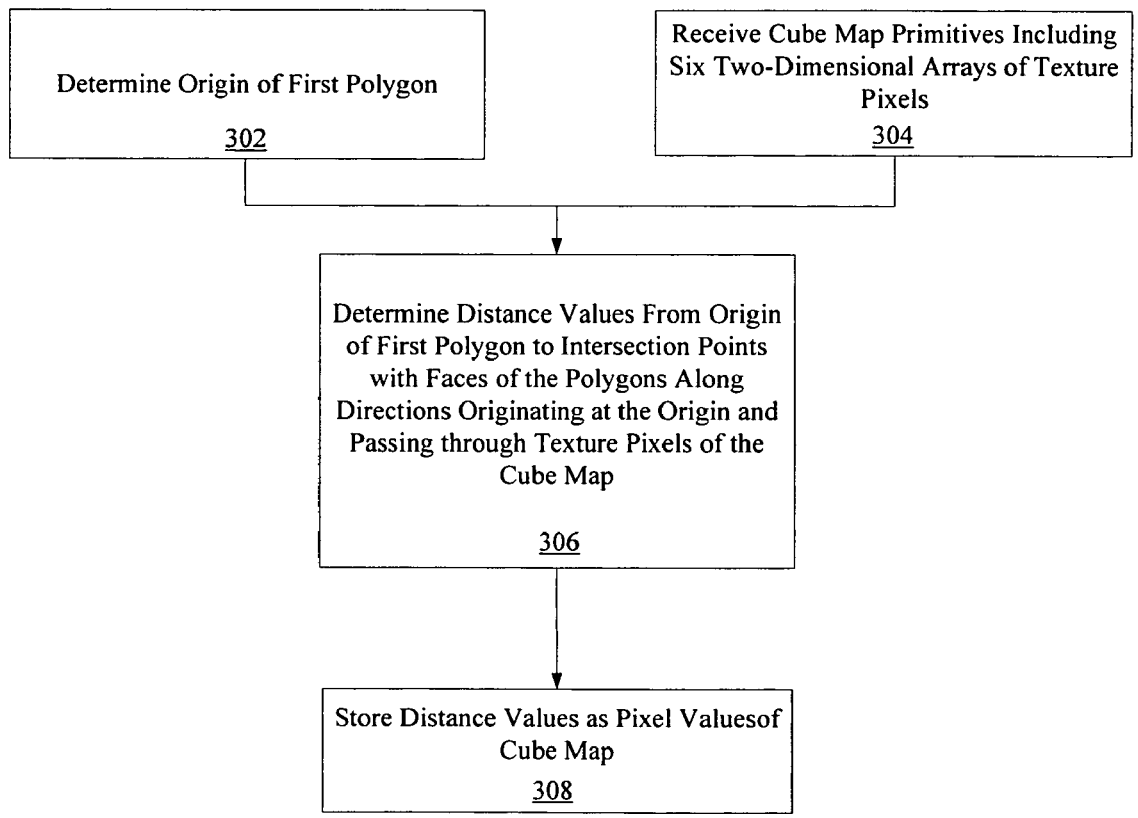
FIG. 3 is a flow chart illustrating one embodiment of generating a distance feature map.
Figure 4:
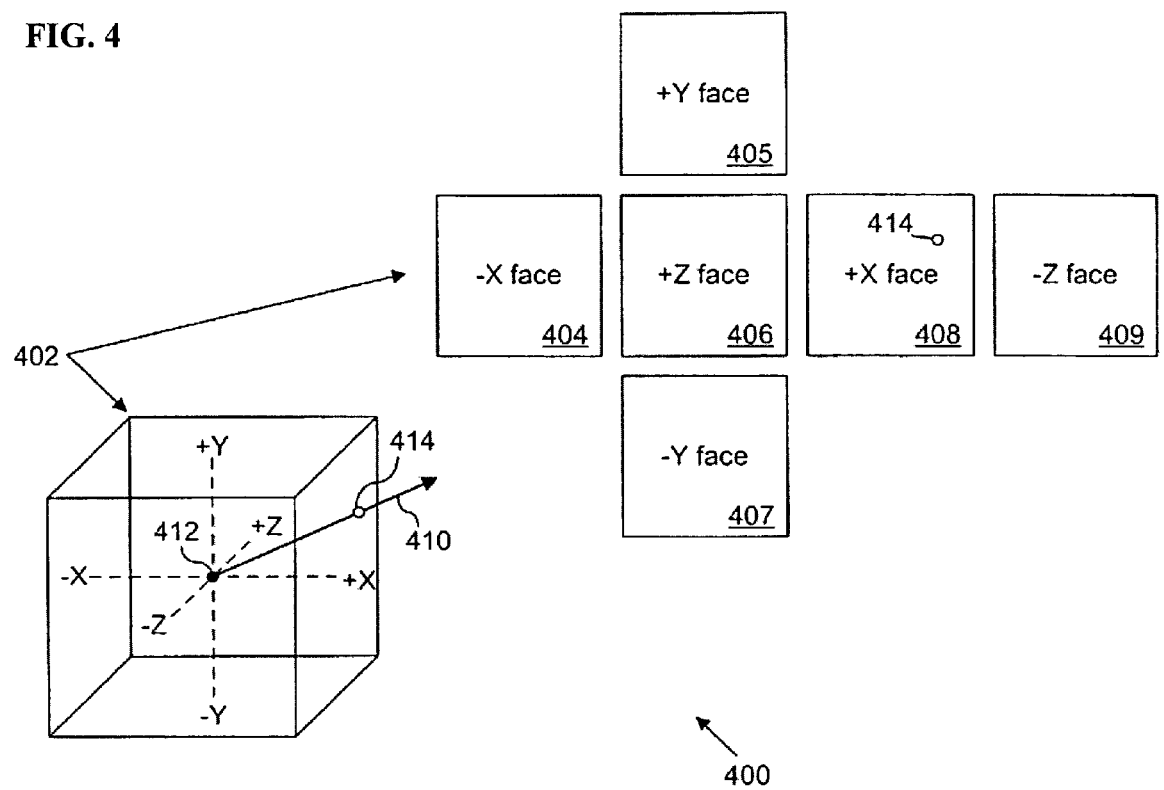
FIGS. 4-7 illustrate embodiments of schemes useful for discussing the processes of FIGS. 2 and 3.

FIG. 3 is a flow chart illustrating one embodiment of generating a cube map and storing distance values in accordance with processing block 206 discussed above. FIG. 4 illustrates one embodiment of a cube map labeling scheme 400. Scheme 400 shows a 3D cube map primitive 402 that may correspond to standard cube map primitives as defined by 3D graphics applications such as, for example, DirectX.

Map 402 may be include six two-dimensional (2D) texture maps 404-409 arranged as the faces of a cube wherein each one of maps 404-409 may include an eight-by-eight array of pixels. According to one embodiment, each of 2D maps 404-409 of 3D cube map 402 may be treated as a lookup table of values that may be accessed by using indexes specifying particular pixels of maps 404-409.

Coordinates for each pixel of 2D maps 404-409 may be indexed by a 3D direction vector 410 originating at an origin 412 of cube map 402. In some embodiments, origin 412 may correspond to the centroid of an object such as a polygon as will be explained in further detail below. According to one embodiment, a set of unique direction vectors are defined such that each vector of the set of vectors passes through a corresponding pixel of one of 2D maps 404-409. For example, vector 410 passes through a pixel 414 of map 408, where map 408 corresponds to a +X face of cube map 402 and where pixel 414 may correspond to a specific (u,v) texture coordinate pair of map 402. Thus, vector 410 may be defined by origin 412 and the texture coordinate pair corresponding to pixel 414.

In one embodiment, origin 412 is the centroid of an object or the circumcenter of an object. However, in other embodiments, origin 412 may include any point lying inside an object. Moreover, while the texture primitive employed in processes 200 and 300 may include a cube map primitive the invention is not limited in this regard and, thus, for example, processes 200 and 300 may be undertaken using other 3D texture primitives such as texture primitives employing more than six 2D faces or, for example, paraboloid or spherical texture primitives.

Referring back to FIG. 3, a determination of an origin of the first and second polygons is made at processing block 302, where the polygons are the same polygons as those received at processing blocks 202 and 204 in FIG. 2. Those skilled in the art will recognize the technique of determining a bounding sphere of a polygon as one way to determine an origin of a polygon in accordance with processing block 302. However in other embodiments, any arbitrary means could be used to determine the origin of a 3D object.

Figure 5A:
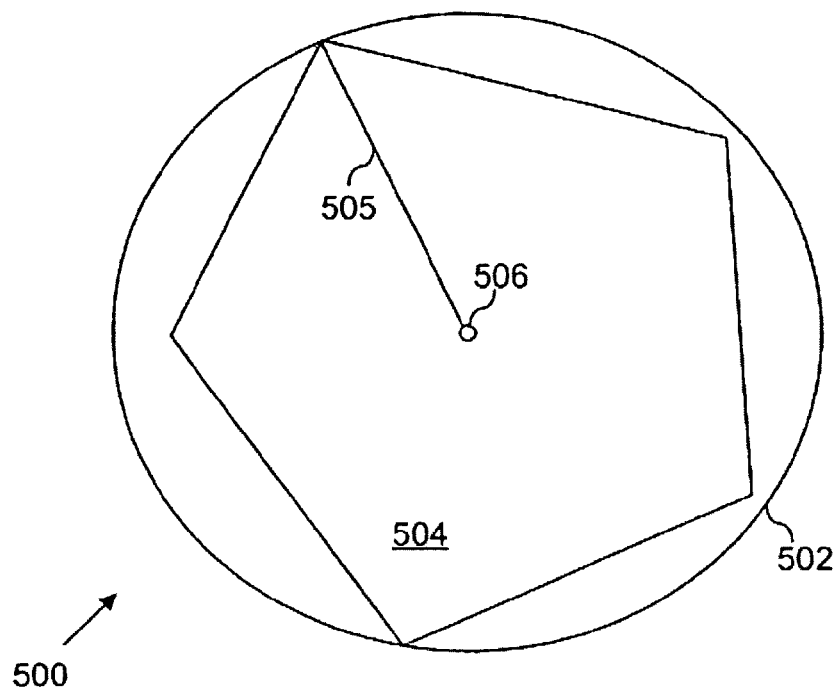

For the sake of discussion, FIG. 5A illustrates a scheme 500 for determining a bounding sphere for a convex polygon in accordance with processing block 302. While, for the purposes of illustration, FIG. 5A illustrates bounding sphere 502 and an associated polygon 504 in 2D, implementations of processing block 302 may be undertaken on a 3D polygon resulting in a 3D bounding sphere.

Bounding sphere 502 represents a hypothetical sphere that encompasses polygon 504 such that the scalar radius 505 of sphere 502 defines a maximum distance from the center 506 of the sphere to any point of polygon 504. When so defined, the center 506 of sphere 502 represents the centroid of polygon 504. Thus, as a result of processing block 302, an origin such as a centroid of the first polygon may be determined.

However for concave polygons, the scheme illustrated in FIG. 5A is modified since a concave polygon may include multiple points inside the polygon from where the entire polygon is visible. Thus, in processing block 302, the process of determining the origin of the first polygon includes using the computational geometry problem known as the "Art Gallery Problem" to extend the cube map distance measuring process to concave polygons.

Figure 5B:
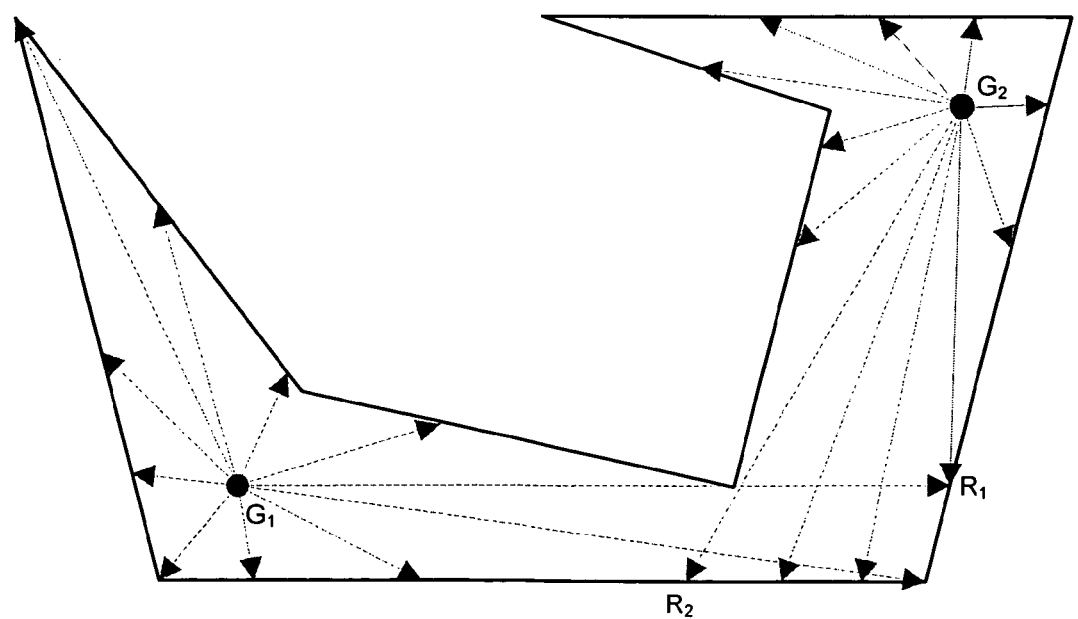

For the Art Gallery Problem, a determination is to be made as to the number of guards (or points) in the polygon from where the entire inside of the polygon is visible. FIG. 5B illustrates a scheme for finding the points in the polygon from where the entire inside of the polygon is visible. As shown in FIG. 5B, points $G_1$ and $G_2$ are the points from which all other points in the polygon are visible. Thus, points $G_1$ and $G_2$ are the guard locations (or centroids) of the polygon.

Subsequently, the bounding sphere for each guard location is determined, as described above with respect to FIG. 5A, the bounding sphere. Here the bounding sphere is represented by the farthest points that can be seen from each guard location $G_1$ and $G_2$. As shown in FIG. 5B, points $R_1$ and $R_2$ are the furthest points that can be seen from $G_1$ and $G_2$, respectively.

Referring back to FIG. 3, a cube map primitive is received for each of the guard location, at processing block 304, where the primitive includes six 2D arrays of texture pixels. At processing block 306, determination of distance values are made from each guard location (e.g., $G_1$ and $G_2$) of the first polygon to intersection points with faces of the first polygon along directions originating at the guard location and passing through pixels of the cube map.

Figure 6:
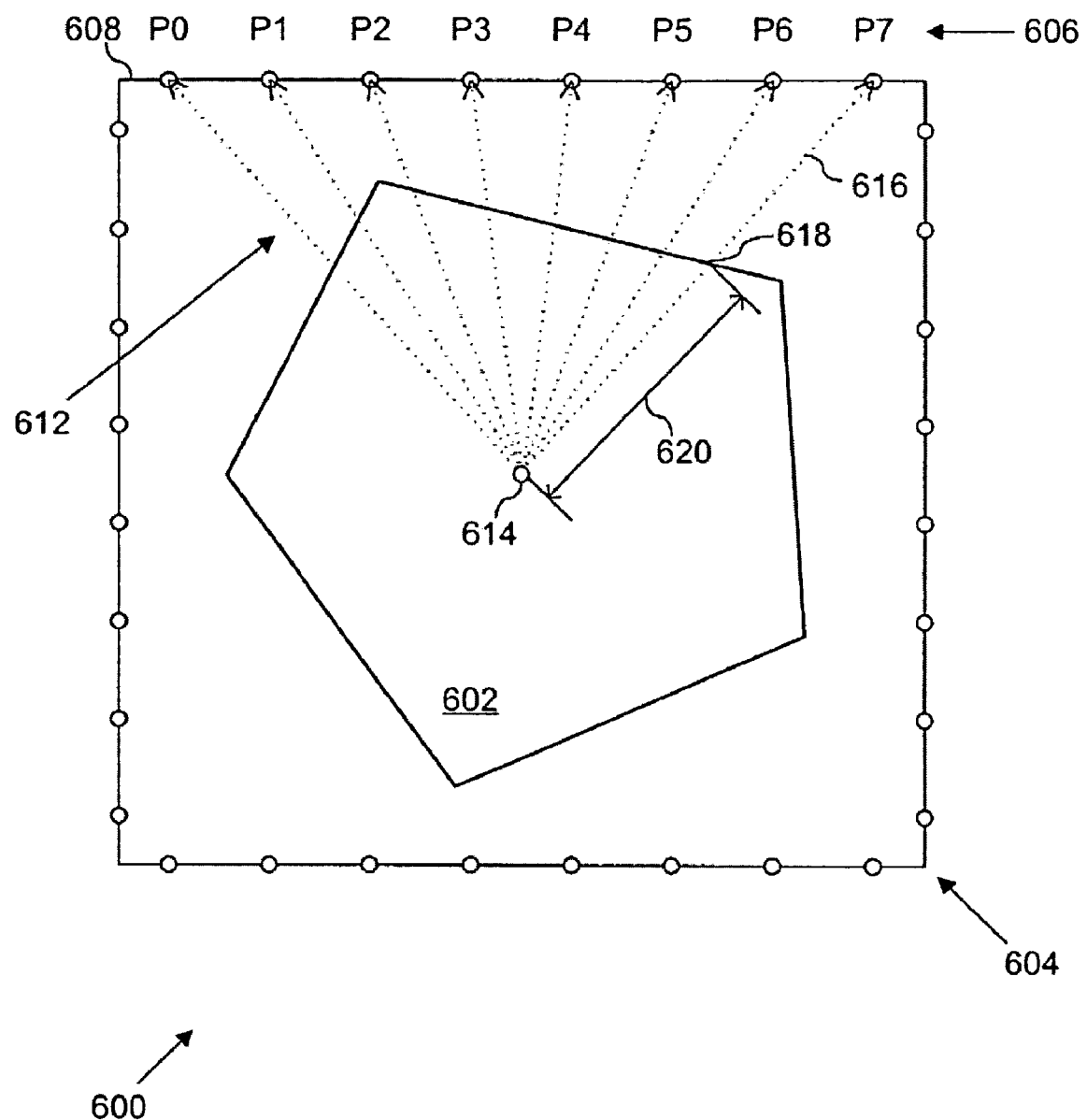

FIG. 6 illustrates a scheme 600 for determining distance values in accordance with some implementations of processing block 306. FIG. 6 shows a 2D cross-section of a polygon 602 and a cube map 604. While, for the purposes of illustration, FIG. 6 illustrates a 2D cross-section of polygon 602 and map 604. Implementations of processing block 306 may be undertaken on a 3D polygon resulting in a determination of distance values with respect to a 3D cube map.

Further, although FIG. 6 illustrates the process with respect to convex polygons, the same process is implemented for each of the multiple guard locations of a concave polygon. Accordingly, a number of 3D cube maps are generated for a concave polygon corresponding to the number of origins.

FIG. 6 shows one row 606 of pixels P1-P7 of one face 608 of map 604 where, in accordance with some implementations of processing block 306, distance values may be determined along eight unique directions 612 where each of directions 612 begins at an origin 614 of polygon 602 and passes through a separate one of pixels 606. Thus, for example, a direction 616 passing through pixel P7 has an intersection 618 with a face of polygon 602 and a distance value 620 defined as the distance between origin 614 and the location of pixel P7. In a similar manner, distance values in accordance with processing block 306 may be determined for all directions 612 in FIG. 6 as well as for all other directions (not shown) for the remaining pixels of cube map 604.

While FIG. 6 shows a cross-section of a cube map 604 where each face of map 604 may include an eight-by-eight array of pixels so that cube map 604 may include a total of 8×8×6 pixels, the invention is not limited to a particular resolution. Thus, for example, processing block 306 may be undertaken with different resolution cube maps for each polygon processed. For example, the cube map received in processing block 302 may include six 2D sixteen-by-sixteen pixel arrays so that the cube map employed may include a total of 1,536 pixels.

Alternatively, the cube map received in processing block 302 may include six 2D four-by-four pixel arrays so that the cube map may include a total of 96 pixels.

Referring back to FIG. 3, distance values for the cube map are stored, processing block 308. In one embodiment, the values stored for each polygon include the number of points on the object farthest in a particular direction, the array of vertices corresponding to the farthest points, the number of triangles that include the vertices and an array of triangle faces including the points.

In some embodiments, an application (e.g., 3D graphics application) may undertake all acts performed in FIG. 3 in a preprocessing stage and supply the resulting texture map to mechanism 102 in processing block 206. Alternatively, in other embodiments, mechanism 102 may undertake the performed acts in a dynamic manner in response to each collision detection event occurring during 3D rendering implemented by engine 100.

Further, for each polyhedron received in processing blocks 202 and 204, an associated cube map storing distance values for that polyhedron may have been generated in processing block 206. In accordance with further embodiments, acts performed in FIG. 3 may result in a cube map being held or stored in memory 106.

Figure 7:
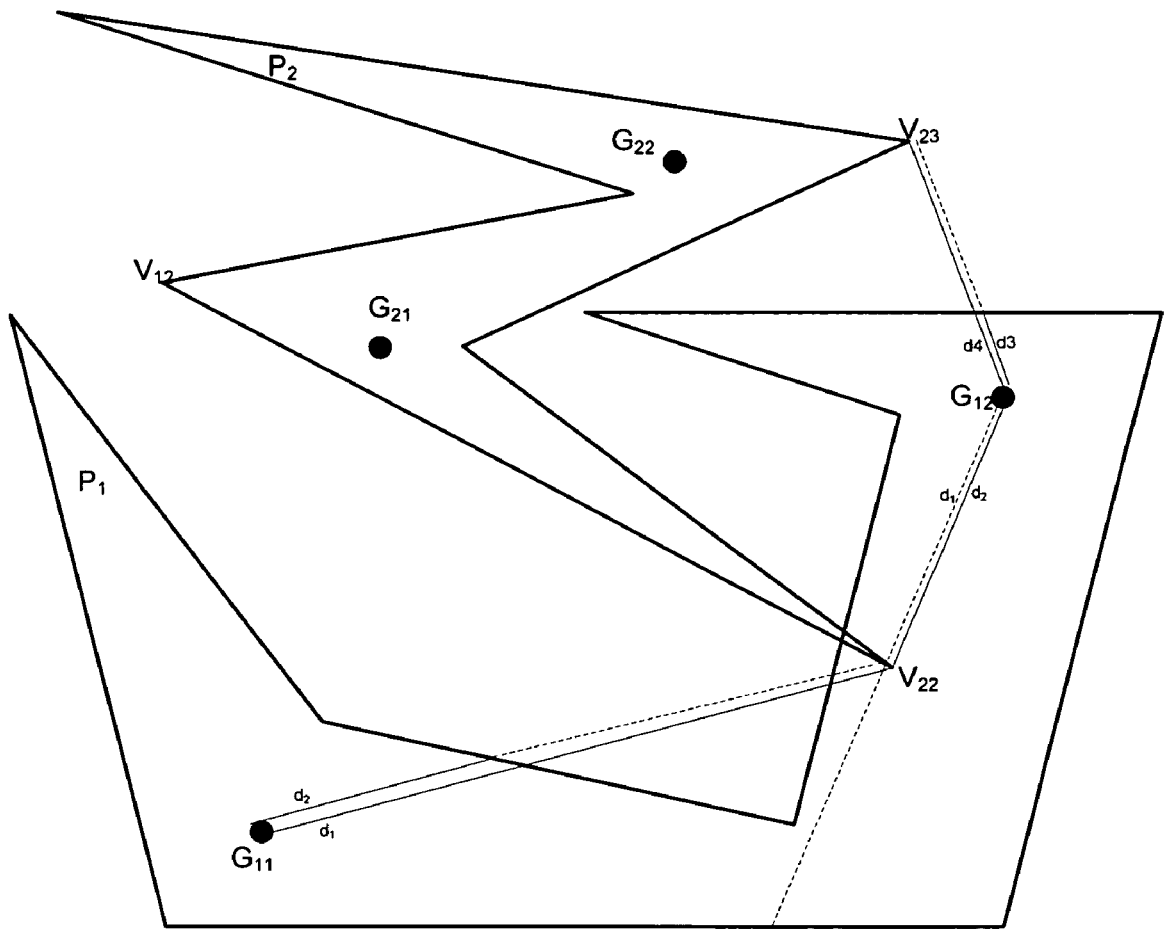

Referring back to FIG. 2, a distance from each origin of the first polyhedron to each origin of the second polyhedron, processing block 205. FIG. 7 illustrates one embodiment of two polygons $P_1$ and $P_2$, used to illustrate the process of performing collision detection as described in FIG. 2. As shown in FIG. 7, polygons $P_1$ and $P_2$ include guard locations $G_{11}$ and $G_{12}$ and $G_{21}$ and $G_{22}$, respectively. Thus, the result of processing block 205 produces the pairs $G_{11}G_{21}$, $G_{11}G_{22}$, $G_{12}G_{21}$ and $G_{12}G_{22}$.

At processing block 206, a bounding sphere test is performed to eliminate obviously non colliding sub-objects that correspond to the guard locations. For instance, if the bounding spheres do not overlap for any of the pair of origins, there is no need for further evaluation for collision detection. Consequently at processing block 208, it is determined whether none of the bounding spheres overlap. If it is determined that no spheres overlap, the process is complete.

However if bounding spheres overlap for at least one pair set, a first distance value is determined from an origin of the first polyhedron to a vertex of the second polyhedron, where the first distance lies along a direction vector extending from the origin of the first polyhedron to a vertex of the second polyhedron, processing block 209.

FIG. 7 shows a first polygon $P_1$ and a second polygon $P_2$ where, in accordance with some implementations of processing block 209, a first distance value d1 may be determined between an guard location $G_{11}$ of polygon $P_1$ and a vertex $V_{22}$ of polygon $P_2$ along a direction vector originating at a guard location $G_{11}$ and passing through vertex $V_{22}$. Similarly, for example, processing block 209 may include determining a first distance value d1 between guard location $G_{12}$ and vertex $V_{22}$ of polygon $P_2$ along a direction vector originating at guard location $G_{12}$ and passing through vertex $V_{22}$.

While, for the purposes of illustration, FIG. 7 illustrates a 2D cross-section of polygons $P_1$ and $P_2$, implementations of processing block 209 may be undertaken with respect to 3D polygons resulting in a determination of a first distance value along a direction vector defined by 3D coordinates. In some embodiments, processing block 209 may be undertaken by mechanism 102 after receiving the first and second polygons in respective acts $P_1$ and $P_2$.

Referring back to FIG. 2, a second distance is determined, along a direction vector, from the guard location of the first polygon to a face of the first polygon by performing one or more lookups to a texture map, processing block 210. Referring again to FIG. 7, processing block 210 may involve determining, for example, a second distance d2 from guard location $G_{11}$ to a face of polygon $P_1$ along the direction vector. In this example, determining second distance d2 may involve looking up the distance values (e.g., determined in processing block 306) that are stored at pixels of the texture map generated in processing block 206 and then linearly interpolating between those distance values to obtain second distance d2 in processing block 210.

Similarly, for example, processing block 210 may involve determining a second distance d2 from guard location $G_{12}$ to a face of polygon $P_2$ along the direction vector. Then, in this example, determining second distance d2 may involve looking up the distance values that are stored at pixels of the texture map generated in processing block 206 and then linearly interpolating between those distance values to obtain second distance d2 in processing block 210.

In some embodiments, processing block 210 may involve mechanism 102 providing texture sampler 104 with lookup indices associated with the pixels. Sampler 104 may then use those indices to generate corresponding memory addresses for accessing the distance values for the corresponding pixels of the cube map stored in memory 106. Sampler 104 may then linearly interpolate between those distance values and provide a resulting interpolated distance value to mechanism 102. Alternatively, Sampler 104 may provide the distance values to mechanism 102 and mechanism 102 may interpolate between those values to determine the second distance in processing block 210.

Referring back to FIG. 2, the first distance value is compared to the second distance value, processing block 212. At decision block 214, it is determined whether the second distance is greater than the first distance. If the second distance is greater than or equal to the first distance, a collision is detected, processing block 216.

Referring again to FIG. 7, processing block 212 may, for example, involve comparing the first distance d1 to the second distance d2 along the direction vector from $G_{12}$. In this case first distance d1 is greater than second distance d2 and no collision will be detected. However, processing block 212 may, for another example, involve comparing the first distance d1 to the second distance d2 along the direction vector from $G_{12}$. In this case second distance d2 is greater than first distance d1 and thus a collision is detected in processing block 216. In some embodiments, mechanism 102 may undertake the comparison of processing block 212 and determine, in processing block 216 that a collision has occurred if the second distance is greater than or equal to the first distance.

If at decision block 214 it is determined that the first distance is greater than the second distance, no collision is detected and it is determined whether the polygons has another guard location for which collision detection is to be performed, decision block 218. If the process has been performed for all guard locations, the above-process is performed for the second polygon. If there are more guard locations for which the process is to be performed, control is returned to processing block 208 where the process is repeated for the guard location.

Using FIG. 7 as an example, after processing guard location $G_{11}$ and determining that the first distance is greater than the second distance, it is determined that there is another guard location ($G_{12}$) for which the process needs to be performed. Thus, control is returned to processing block 208 where the process is repeated.

The processing blocks shown in FIGS. 2 and 3 need not be implemented in the order shown; nor do all of the acts necessarily need to be performed. Also, those acts that are not dependent on other acts may be performed in parallel with the other acts. For example, processing blocks 202 and 204 may be undertaken in parallel. Alternatively, processing blocks 202 and 204 may be combined into a single action. In other words, the receipt of first and second polygons may take place in a single action. Further, at least some of the acts in this figure may be implemented as instructions, or groups of instructions, implemented in a machine-readable medium.

According to one embodiment, mechanism 102 as implemented in the processes described in FIG. 2 may include the following pseudo-code:

```
Bool Collision_Detect_Using_Cubemaps(...)
{
   bool Collision = false;
   foreach pair (G1I,G2J) {
      Eliminate the pairs that fail bounding sphere tests.
   }
   Sort (line-segments(G1I,G2J)) // using distance as the key;
   foreach centroid C1I of P1 {
      foreach centroid C2J of P2 {
         // Set of points of P1 farthest from G1I in the direction G1I,G2J
         Set1 = farthest-feature-map-1(G1I,G2J)
         if (distance_map_test(Set1)) {
```

-continued

```
            collision = true;
            Break;
         }
         // Set of points of P2 farthest from G2J in the direction G2J,G1I
         Set2 = farthest-feature-map-2(G2J,G1I)
         if (distance_map_test(Set2) {
            collision = true;
            break;
         }
      }
   }
   return collision;
}
Bool distance_map_test(set X)
{
   foreach vertex V2J of set X {
      Direction Vector = V2J – C1;
      d1 = texCube (Direction Vector);
      d2 = distance (C1, V2J);
      if (d1 >= d2) {
         Collision = true;
         break; // Collision
      }
   }
}
Vertex_List Farthest-feature-map(direction)
{
   Return a list of vertices that are farthest from centroid in a given direction.
}
```

Figure 8:
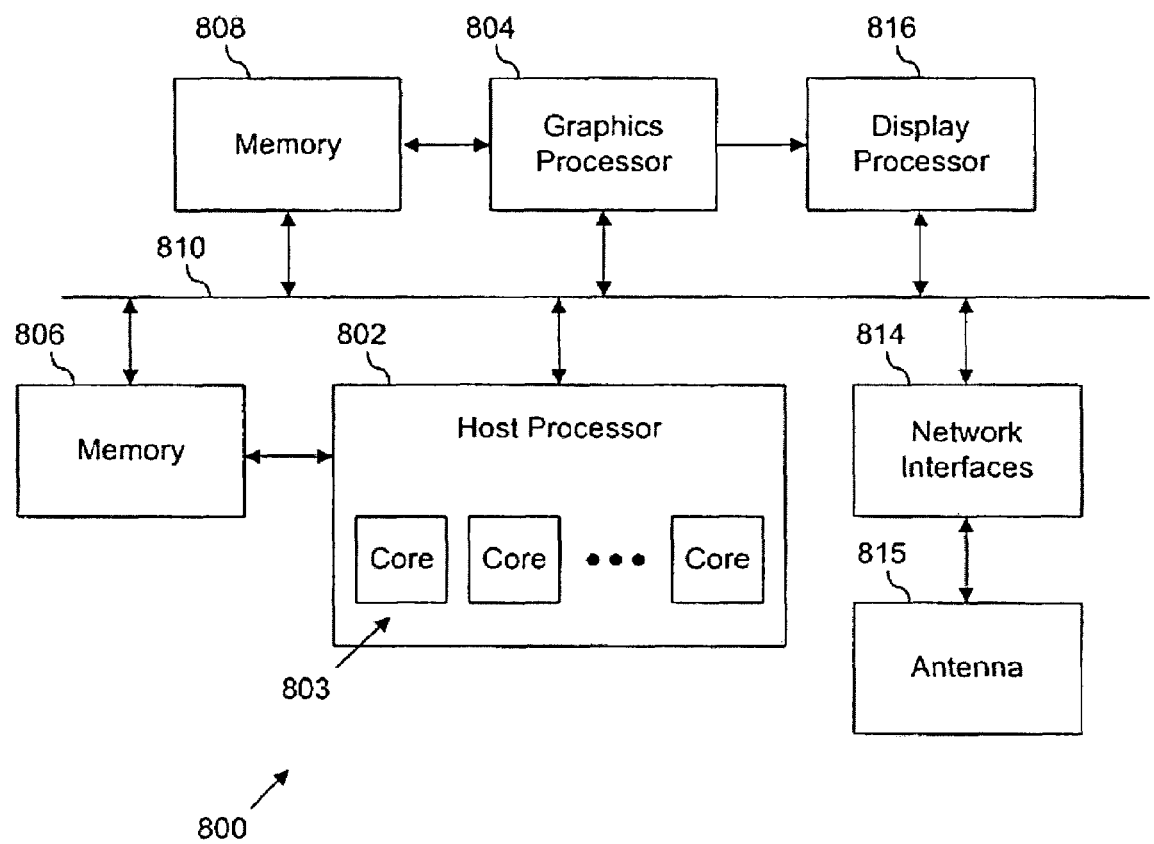
FIG. 8 illustrates a system in accordance with some implementations of the invention.

FIG. 8 illustrates an example system 800 in accordance with some implementations of the invention. System 800 may include a host processor 802 having two or more processing cores 803, a graphics processor 804, memories 806 and 808 (e.g., dynamic random access memory (DRAM), static random access memory (SRAM), non-volatile memory, etc.), a bus or communications pathway(s) 810, network interfaces 814 (e.g., wired and/or wireless local area network (LAN) and/or wide area network (WAN) and/or personal area network (PAN), and/or other wired and/or wireless network interfaces), and a display processor and/or controller 816.

System 800 may also include an antenna 815 (e.g., dipole antenna, narrowband Meander Line Antenna (MLA), wideband MLA, inverted "F" antenna, planar inverted "F" antenna, Goubau antenna, Patch antenna, etc.) coupled to network interfaces 814. System 800 may be any system suitable for processing 3D graphics data and providing that data in a rasterized format suitable for presentation on a display device (not shown) such as a liquid crystal display (LCD), or a cathode ray tube (CRT) display to name a few examples.

System 800 may assume a variety of physical implementations. For example, system 800 may be implemented in a personal computer (PC), a networked PC, a server computing system, a handheld computing platform (e.g., a personal digital assistant (PDA)), a gaming system (portable or otherwise), a 3D capable cellular telephone handset, etc.

Moreover, while all components of system 800 may be implemented within a single device, such as a system-on-a-chip (SOC) integrated circuit (IC), components of system 800 may also be distributed across multiple ICs or devices. For example, host processor 802 along with components 806 and 814 may be implemented as multiple ICs contained within a single PC while graphics processor 804 and components 808 and 816 may be implemented in a separate device such as a television or other display coupled to host processor 802 and components 806 and 814 through communications pathway 810.

Host processor 802 may include a special purpose or a general purpose processor including any control and/or processing logic, hardware, software and/or firmware, capable of providing graphics processor 504 with 3D graphics data and/or instructions. Processor 802 may perform a variety of 3D graphics calculations such as 3D coordinate transformations, etc. the results of which may be provided to graphics processor 804 over bus 810 and/or that may be stored in memories 806 and/or 808 for eventual use by processor 804. In some implementations of the invention host processor 802 may be a Central Processing Unit (CPU).

In one embodiment, host processor 802 may be capable of performing any of a number of tasks that support or enable real-time, multi-resolution 3D collision detection using cube maps. Support tasks may include, for example, although the invention is not limited in this regard, providing 3D graphics data to graphics processor 804, placing one or more texture maps, such as cube maps, in memory 808, downloading microcode (via antenna 815 and interfaces 814) to processor 804, initializing and/or configuring registers within processor 804, interrupt servicing, and providing a bus interface for uploading and/or downloading 3D graphics data.

In alternate embodiments, some or all of these functions may be performed by graphics processor 804. While FIG. 9 shows host processor 802 and graphics processor 804 as distinct components, the invention is not limited in this regard and those of skill in the art will recognize that processors 802 and 804 possibly in addition to other components of system 800 may be implemented within a single IC.

In accordance with some implementations of the invention, each of cores 803 may perform, in parallel, processes 200/300 for separate pairs of polygons using separate implementations of collision detection mechanism 102. Alternatively, such parallel processing schemes may be implemented by graphics processor 804.

Graphics processor 804 may include any processing logic, hardware, software, and/or firmware, capable of processing graphics data. In one implementation, graphics processor 804 may implement a 3D graphics architecture capable of processing graphics data in accordance with one or more standardized rendering application programming interfaces (APIs) such as OpenGL 2.0™ ("The OpenGL Graphics System: A Specification" (Version 2.0; Oct. 22, 2004)) and DirectX 9.0™ (Version 9.0c; Aug. 8, 2004) to name a few examples, although the invention is not limited in this regard. Graphics processor 804 may process 3D graphics data provided by host processor 802, held or stored in memories 806 and/or 808, and/or provided by sources external to system 800 and obtained over bus 810 from interfaces 814.

Graphics processor 804 may receive 3D graphics data in the form of 3D scene data and process that data to provide image data in a format suitable for conversion by display processor 816 into display-specific data. In addition, graphics processor 804 may implement a variety of 3D graphics processing components and/or stages (not shown) such as a rasterizer stage in addition to one or more texture samplers similar to texture sampler 104.

Texture samplers implemented by graphics processor 804 may fetch or access texture data stored or held in the form of cube maps in either or both of memories 806 and 808. Further, in accordance with some implementations of the invention, graphics processor 804 may implement two or more texture samplers capable of using distance values stored in one or more cube maps to undertake collision detection for multiple pairs of polygons in a parallel fashion.

Bus or communications pathway(s) 810 may include any mechanism for conveying information (e.g., graphics data, instructions, etc.) between or amongst any of the elements of system 800. For example, although the invention is not limited in this regard, communications pathway(s) 810 may include a multipurpose bus capable of conveying, for example, instructions (e.g., macrocode) between processor 802 and processor 804. Alternatively, pathway(s) 810 may include a wireless communications pathway.

Display processor 816 may include any processing logic, hardware, software, and/or firmware, capable of converting rasterized image data supplied by graphics processor 804 into a format suitable for driving a display (i.e., display-specific data). For example, while the invention is not limited in this regard, processor 804 may provide image data to processor 816 in a specific color data format, for example in a compressed red-green-blue (RGB) format, and processor 816 may process such RGB data by generating, for example, corresponding LCD drive data levels etc.

Although FIG. 8 shows processors 804 and 816 as distinct components, the invention is not limited in this regard, and those of skill in the art will recognize that, for example, some if not all of the functions of display processor 816 may be performed by graphics processor 804 and/or host processor 802.

Thus, by taking advantage of hardware primitives such as cube maps a collision detection mechanism in accordance with the invention may execute entirely on a graphics processor such as processor 804 with, possibly, the exception of the preprocessing of process 300 which may be implemented once for each polygon and done ahead of process 200.

Further, a collision detection mechanism in accordance with the invention can leverage a high level octree structure to minimize object-object detections and may rely on cube maps for those object-object interactions that are identified as candidates by the octree data structure. Thus, by moving the collision detection algorithm to a graphics processor (e.g., processor 804) the CPU (e.g., host processor 802) may be freed up to undertake other tasks. Although a collision detection algorithm in accordance with the invention may execute on a CPU as well.

While the foregoing description of one or more instantiations consistent with the claimed invention provides illustration and description of the invention it is not intended to be exhaustive or to limit the scope of the invention to the particular implementations disclosed. Clearly, modifications and variations are possible in light of the above teachings or may be acquired from practice of various implementations of the invention. For example, while FIG. 1 and the accompanying text may show and describe a single texture sampler 104 coupled to a single texture memory 106, those skilled in the art will recognize that data processors in accordance with the invention may include rendering engines that employ multiple texture samplers, each operating in accordance with the invention, coupled to one or more texture memories. Clearly, many other implementations may be employed to provide for real-time, multi-resolution 3D collision detection using cube maps in accordance with the invention.

No device, element, act, data type, instruction etc. set forth in the description of the present application should be construed as critical or essential to the invention unless explicitly described as such. Also, as used herein, the article "a" is intended to include one or more items. Moreover, when terms or phrases such as "coupled" or "responsive" or "in communication with" are used herein or in the claims that follow, these terms are meant to be interpreted broadly. For example, the phrase "coupled to" may refer to being communicatively, electrically and/or operatively coupled as appropriate for the context in which the phrase is used. Variations and modifications may be made to the above-described implementation(s) of the claimed invention without departing substantially from the spirit and principles of the invention. All such modifications and variations are intended to be included herein within the scope of this disclosure and protected by the following claims.

What is claimed is:

1. An apparatus comprising an integrated circuit including a collision detection mechanism to detect a collision between a first concave polygon and a second concave polygon, the collision detection mechanism generating a texture map by determining a location of one or more origins of the first polygon, determining a first distance corresponding to a distance from a first origin of the first polygon to a vertex of the second polygon defining a direction vector, determining a second distance along the direction vector corresponding to a distance from the first origin of the first polygon to a face of the first polygon and detecting a collision between the first and second polygons if the second distance is greater than or equal to the first distance, wherein the location of the one or more origins of the first polygon is determined by finding a number of guard locations in the first polygon from where the entire inside of the first polygon is visible and determining a bounding sphere for each determined guard location in the first polygon representing furthest visible points.

2. The apparatus of claim 1 wherein the collision detection mechanism further performs determining if the first polygon includes multiple origins if it is determined that the first distance is greater than the second distance.

3. The apparatus of claim 2 wherein the collision detection mechanism further performs determining a first distance corresponding to a distance from a second origin of the first polygon to a vertex of the second polygon defining a second direction vector, determining a second distance along the second direction vector corresponding to a distance from the second origin of the first polygon to a face of the first polygon and detecting a collision between the first and second polygons if the second distance is greater than or equal to the first distance.

4. The apparatus of claim 1 wherein the collision detection mechanism further performs a bounding sphere test between each origin of the first polygon to each origin of the second polygon before determining the first distance.

5. The apparatus of claim 4 wherein no collision between the first polygon and the second polygon is detected if no bounding sphere of an origin of the first polygon intersects with a bounding sphere of an origin of the second polygon.

6. An article comprising a machine-accessible medium having stored thereon instructions that, when executed by a machine, cause the machine to:
receive a first concave polygon;
receive a second concave polygon;
generate a texture map by:
determining a location of one or more origins of the first polygon by:
determining a number of guard locations in the first polygon from
where the entire inside of the first polygon is visible; and
determining a bounding sphere for each determined guard location in the first polygon representing furthest visible points;
determine a plurality of distances from each of the one or more origins to all faces of the first polygon, wherein each distance of the plurality of distances is determined along a respective vector of a plurality of vectors, each vector of the plurality of vectors originating at an origin and passing through a respective element of the texture map; and
store each distance of the plurality of distances as a value of the respective element of the texture map.

7. The article of claim 6 wherein the instructions, when executed by a machine, further cause the machine to determine if the first polygon includes multiple origins if it is determined that the first distance is greater than the second distance.

8. The article of claim 7 wherein the instructions, when executed by a machine, further cause the machine to:
determine a first distance corresponding to a distance from a second origin of the first polygon to a vertex of the second polygon, the second origin of the first polygon and the vertex of the second polygon defining a second direction vector;
determine, along the second direction vector a second distance corresponding to a distance from the second origin of the first polygon to a face of the first polygon; and
detect a collision between the first and second polygons if the second distance is greater than or equal to the first distance.

9. The article of claim 6, wherein the instructions, when executed by a machine, further cause the machine to perform a bounding sphere test between each origin of the first polygon to each origin of the second polygon before determining the first distance.

10. The article of claim 9 wherein the instructions, when executed by a machine, further cause the machine to determine no collision between the first polygon and the second polygon if no bounding sphere of an origin of the first polygon intersects with a bounding sphere of an origin of the second polygon.

11. The article of claim 6 wherein the instructions, when executed by a machine, further cause the machine to:
determine a first distance corresponding to a distance from a first origin of the first polygon to a vertex of the second polygon, the origin of the first polygon and the vertex of the second polygon defining a direction vector;
determine, along the direction vector a second distance corresponding to a distance from the first origin of the first polygon to a face of the first polygon; and
detect a collision between the first and second polygons if the second distance is greater than or equal to the first distance.

12. A system comprising:
memory to store a texture map, the texture map comprising pixels storing distance values; and
a collision detection mechanism to detect a collision between a first concave polygon and a second concave polygon, the collision detection mechanism generating the texture map by determining a location of one or more origins of the first polygon, determining a first distance corresponding to a distance from a first origin of the first polygon to a vertex of the second polygon defining a direction vector, determining a second distance along the direction vector corresponding to a distance from the first origin of the first polygon to a face of the first polygon and detecting a collision between the first and second polygons if the second distance is greater than or equal to the first distance, wherein the location of the one or more origins of the first polygon is determined by finding a number of guard locations in the first polygon from where the entire inside of the first polygon is visible and determining a bounding sphere for each determined guard location in the first polygon representing furthest visible points.

13. The system of claim 12 further comprising texture sampling logic to receive one or more lookup indices from the collision detection mechanism specifying pixels of a texture map and to retrieve the distance values in response to the one or more lookup indices.

14. The system of claim 12 wherein the collision detection mechanism further performs determining a first distance corresponding to a distance from a second origin of the first polygon to a vertex of the second polygon defining a second direction vector, determining a second distance along the second direction vector corresponding to a distance from the second origin of the first polygon to a face of the first polygon and detecting a collision between the first and second polygons if the second distance is greater than or equal to the first distance.

15. The system of claim 12 wherein the collision detection mechanism further performs a bounding sphere test between each origin of the first polygon to each origin of the second polygon before determining the first distance.

* * * * *